UNITED STATES PATENT OFFICE.

FRANÇOIS LECOURT AND ACHILLE GUILLEMARE, OF PARIS, FRANCE.

IMPROVEMENT IN COLORING FRUITS AND VEGETABLES.

Specification forming part of Letters Patent No. 192,771, dated July 3, 1877; application filed May 1, 1877.

*To all whom it may concern:*

Be it known that we, FRANÇOIS LECOURT, manufacturer of preserved vegetables and fruits, and ACHILLE GUILLEMARE, professor of chemistry, both of Paris, France, have invented a certain new and useful Improvement in Coloring Vegetable Products; and we do hereby declare that the following is a full and exact description thereof.

The nature of our invention consists in applying to vegetables, (such as pease, French beans, and others,) to fruits, (such as greengages and others,) to pickles, such as gherkins and others,) the chlorophyl extracted from plants, such as spinach, sorrel, clover, and others, in sufficient quantity, so that when thus treated these vegetables, fruits, and pickles maintain their fine natural green color when they are boiled *in vacuo* or subjected to any of the usual known processes for effecting their preservation, or when they are ultimately cooked for food.

Therefore, the object of this invention is to substitute for salts of copper and other metallic preparations, (which are known to be dangerous and prejudicial to health,) now in general use for imparting a green color to preserved vegetables and fruits in general, the exclusive application for this purpose of chlorophyl extracted from alimentary plants, which contain the same in abundance.

Our process may be subdivided in five successive operations, thus: First, having selected the green leaves of spinach, sorrel, or other similar plants, we scald them for a few minutes with boiling water, then let them drain, and triturate them with knives or other cutting instruments. Secondly, we submit the triturated mass to the action of alkalies, thus: taking, say, sixty pounds of the same, we add thereto about the same weight of a solution of caustic soda, marking 12° 5′ on a Baumé scale, and we boil this mixture until the leaves are dissolved. Thirdly, we prepare therewith a lake by precipitating ordinary alum with this alkaline solution of chlorophyl; we then draw off and wash the precipitate in abundance of water, and finally express therefrom the excess of water. Fourthly, we make use of this lake by placing about thirty pounds of the same in a basin with about fifteen pounds of soluble phosphates, specially phosphates of soda, of potassium, of ammoniac, or of acid phosphates, or alkaline citrates or double tartrates, and we add thereto water until the liquor marks 2° to 5° on a Baumé scale; and, fifthly, for the purpose of communicating the green color contained in this preparation of chlorophyl—first, to preserved vegetable products which have been previously boiled or partly boiled; secondly, to vegetable products or fruits preserved by the well-known processes of desiccation and compression; and thirdly, to the preservation of green vegetables previously decolored by salt, and for which the vacuum process is not necessary, we simply scald either of the three above-mentioned products in such chlorophyl in solution marking from 2° to 4° on a Baumé scale, and heated to about 212° Fahrenheit. The duration of the immersion may vary from two to fifteen minutes, according to the nature of the vegetables or fruits thus treated. After allowing them to cool and drain they are in a proper state for boxing, according to one or other of the three processes of preservation above mentioned.

The effect of this operation is to impart to the products treated a fine permanent green color due to the absorption and fixation of an excess of chlorophyl.

We claim as our invention—

1. The described method of imparting a permanent green color to vegetables, fruits, or pickles, to be preserved according to any known process, by scalding such vegetable products from two to fifteen minutes with chlorophyl in solution, as above set forth, heated to about 212° Fahrenheit.

2. The method described of using a solution of chlorophyl, prepared as set forth, when combined with the soluble alkaline or acid-phosphates, or other vegetable salts, in the proportions and in the manner set forth.

F. LECOURT.
A. GUILLEMARE.

Witnesses:
WM. T. SHOUTHOSE,
R. H. BRAUDOE.